United States Patent
Fitzpatrick et al.

(10) Patent No.: US 9,366,157 B2
(45) Date of Patent: Jun. 14, 2016

(54) LUBE OIL SUPPLY SYSTEM AND METHOD OF REGULATING LUBE OIL TEMPERATURE

(71) Applicant: General Electric Company, Schenectady, NY (US)

(72) Inventors: Matthew Paul Fitzpatrick, Colonie, NY (US); Matthew Kenneth King, Esperance, NY (US); Jon Michael Merchant, Clifton Park, NY (US); Steven Paul Scarlata, Wynantskill, NY (US)

(73) Assignee: General Electric Company, Schenectady, NY (US)

( * ) Notice: Subject to any disclaimer, the term of this patent is extended or adjusted under 35 U.S.C. 154(b) by 432 days.

(21) Appl. No.: 13/962,104

(22) Filed: Aug. 8, 2013

(65) Prior Publication Data
US 2015/0044036 A1    Feb. 12, 2015

(51) Int. Cl.
| | |
|---|---|
| *F01D 1/24* | (2006.01) |
| *F01M 9/00* | (2006.01) |
| *F01D 25/18* | (2006.01) |
| *F01M 5/00* | (2006.01) |
| *F02C 7/14* | (2006.01) |

(52) U.S. Cl.
CPC ............. *F01D 25/18* (2013.01); *F01M 5/005* (2013.01); *F02C 7/14* (2013.01); *Y02T 50/675* (2013.01)

(58) Field of Classification Search
CPC ............ F01D 25/18; F02C 7/14; F01M 5/005
USPC ............................................ 415/175; 184/6.1
See application file for complete search history.

(56) References Cited

U.S. PATENT DOCUMENTS

| | | | | |
|---|---|---|---|---|
| 4,151,710 A | * | 5/1979 | Griffin | ....................... F02C 7/14 |
| | | | | 184/6.11 |
| 5,318,151 A | * | 6/1994 | Hood | ..................... F04C 29/021 |
| | | | | 184/104.1 |
| 6,418,887 B1 | * | 7/2002 | Okamoto | ............... F01M 5/005 |
| | | | | 123/41.33 |
| 2004/0107922 A1 | | 6/2004 | Roth | |
| 2006/0076426 A1 | | 4/2006 | Schuetze et al. | |
| 2008/0110596 A1 | * | 5/2008 | Schwarz | .................. F01D 25/08 |
| | | | | 165/104.11 |
| 2008/0314564 A1 | | 12/2008 | Nagaseki et al. | |

(Continued)

FOREIGN PATENT DOCUMENTS

| | | |
|---|---|---|
| CN | 2227770 | 5/1996 |
| JP | 05126990 | 5/1993 |

(Continued)

*Primary Examiner* — Hoang Nguyen
(74) *Attorney, Agent, or Firm* — Ernest G. Cusick; Hoffman Warnick LLC (57) ABSTRACT

A lube oil supply system of a turbine system and method of regulating lube oil temperatures. In one embodiment, the system includes a first valve positioned on a lube oil bypass conduit in fluid communication with a lube oil supply line to a heat exchanger. The first valve may be positioned in parallel with the heat exchanger. The system may also include a second valve positioned on a cooling fluid supply line in fluid communication with the heat exchanger, and a lube oil control system operably connected to the first valve and the second valve. The lube oil control system may be configured to modify a position of at least one of the first valve, or the second valve in response to determining a temperature of a lube oil of the lube oil supply line differs from a predetermined lube oil temperature threshold.

20 Claims, 5 Drawing Sheets

(56) References Cited

U.S. PATENT DOCUMENTS

| | | | |
|---|---|---|---|
| 2010/0107603 A1* | 5/2010 | Smith | F02C 7/14 60/267 |
| 2010/0116484 A1 | 5/2010 | Kokubo et al. | |
| 2011/0259445 A1 | 10/2011 | Lum et al. | |
| 2012/0247582 A1 | 10/2012 | Lamb et al. | |
| 2014/0271118 A1* | 9/2014 | Junod | F02C 7/06 415/1 |

FOREIGN PATENT DOCUMENTS

| | | |
|---|---|---|
| JP | 09068003 | 11/1997 |
| JP | 10073263 | 3/1998 |
| JP | 2002310390 | 10/2002 |
| JP | 2002323117 | 11/2002 |
| JP | 2009015594 | 1/2009 |
| WO | 2009038002 A1 | 3/2009 |

* cited by examiner

LUBE OIL SUPPLY SYSTEM AND METHOD OF REGULATING LUBE OIL TEMPERATURE

BACKGROUND OF THE INVENTION

1. Technical Field

The disclosure is related generally to turbine systems. More particularly, the disclosure is related to a lube oil supply system of a turbine system and method of regulating lube oil temperatures within a turbine system.

2. Related Art

Lube oil systems for turbine systems may aid in the prevention of mechanical wear in the components (e.g., generators, bearings, gears) of the turbine system. More specifically, lube oil systems may provide a consistent and steady flow of oils to turbine system components in order to lubricate, clean component contact surfaces and/or to remove heat generated by moving and stationary turbine system components. The temperature of the lube oil flowing through the components of the turbine system may be dependent, at least in part, on the operational characteristics (e.g., temperature) of the turbine system and the turbine system components. As a result, conventional lube oil systems may include a heat exchanger, which may regulate the temperature of the lube oil depending on the operational characteristic of the turbine system. Using cooling fluid (e.g., water or other cooling fluid), the heat exchanger of the lube oil system may regulate the temperature of the lube oil before it flows to the turbine system. In a closed-loop fluid supply system, the cooling fluid may be provided from a supply tank included in the lube oil system or packaged as part of a separate plant cooling water system and may continuously recirculate the cooling fluid to the heat exchanger. Alternatively, in an open-loop fluid supply system, cooling fluid may be continuously provided and disregarded from a source outside of the lube oil system, including, cooling towers, lakes, oceans and rivers. In contrast to closed-loop fluid supply system, where the cooling fluid is substantially filtered, the cooling fluid in an open-loop fluid supply system may include contaminants (e.g., debris, dirt/sand particles, etc.) that can harm the heat exchanger. More specifically, during the operation of a lube oil system that includes an open-loop fluid supply system, contaminants of the cooling fluid may cause fouling within the heat exchanger during high operational temperatures of the lube oil system. The high operational temperatures cause the contaminants in the cooling fluid to breakdown and substantially "coat" the heat exchanger. As a result, the heat transfer performance of the heat exchanger may be negatively affected by the fouling and, the temperature regulation of the lube oil may also be negatively affected. This may ultimately decrease the performance of the turbine system. To prevent fouling within the heat exchanger, the cooling fluid must regulate the temperature of the lube oil and/or the heat exchanger.

Conventional lube oil systems include components to minimize the risk of fouling within the heat exchanger during high operational temperatures of the lube oil system. For example, one conventional lube oil system may include a 3-way valve positioned on the fluid lines of either the cooling fluid supply or the lube oil supply. By adjusting the positioning of the 3-way valve, the temperature of the lube oil and/or the heat exchanger may be regulated. However, the use of a 3-way valve may cause pressure drops in the fluid lines that may hinder flow rate, and may negatively impact the operational performance of the lube oil system and/or the turbine system.

Another example of a convention lube oil system may include a 2-way valve on the fluid lines of either the cooling fluid supply or the lube oil supply. By adjusting the positioning of the 2-way valve, the flow rate of the respective fluid (e.g., cooling fluid, lube oil) may be adjusted to regulate the temperature of the lube oil and/or the heat exchanger. However, the use of a single 2-way valve in the conventional lube oil system may prevent control of the flow of both the cooling fluid and the lube oil. As a result, dependent upon where the 2-way valve is positioned, the risk of fouling during high operational temperatures of the lube oil system may be slightly reduced, but may not be significantly reduced or eliminated.

BRIEF DESCRIPTION OF THE INVENTION

A lube oil supply system of a turbine system and method of regulating lube oil temperatures is disclosed. In one embodiment, the system includes: a first valve positioned on a lube oil bypass conduit in fluid communication with a lube oil supply line to the heat exchanger, the first valve positioned in parallel to the heat exchanger in fluid communication with the lube oil supply line; a second valve positioned on a cooling fluid supply line in fluid communication with the heat exchanger; and a lube oil control system operably connected to the first valve and the second valve, the lube oil control system configured to: modify a position of at least one of the first valve, or the second valve in response to determining a temperature of a lube oil of the lube oil supply line differs from a predetermined lube oil temperature threshold.

A first aspect of the invention includes a lube oil supply system including: a first valve positioned on a lube oil bypass conduit in fluid communication with a lube oil supply line to the heat exchanger, the first valve positioned in parallel to the heat exchanger in fluid communication with the lube oil supply line; a second valve positioned on a cooling fluid supply line in fluid communication with the heat exchanger; and a lube oil control system operably connected to the first valve and the second valve, the lube oil control system configured to: modify a position of at least one of the first valve, or the second valve in response to determining a temperature of a lube oil of the lube oil supply line differs from a predetermined lube oil temperature threshold.

A second aspect of the invention includes an apparatus including: a turbine system; a lube oil supply line in fluid communication with the turbine system, the lube oil supply line including: a lube oil bypass conduit; and a first valve positioned on the lube oil bypass conduit; a heat exchanger in fluid communication with the lube oil supply line, the heat exchanger positioned in parallel to the first valve positioned on the lube oil bypass conduit of the lube oil supply line; a second valve positioned on a cooling fluid supply line in fluid communication with the heat exchanger; and a lube oil control system operably connected to the first valve and the second valve, the lube oil control system configured to: modify a position of at least one of the first valve, or the second valve in response to determining a temperature of a lube oil of the lube oil supply line differs from a predetermined lube oil temperature threshold.

A third aspect of the invention includes a method of regulating lube oil temperature in a turbine system, performed using a lube oil control system. The method includes: directing lube oil of a lube oil supply line through at least one of: a heat exchanger in fluid communication with the lube oil supply line, or a lube oil bypass conduit of the lube oil supply line, the lube oil bypass conduit including a first valve positioned in parallel to the heat exchanger; directing a cooling fluid of a cooling fluid supply line through the heat exchanger in fluid communication with the cooling fluid supply line, the cooling fluid supply line including a second valve; and modifying a position of at least one of the first valve, or the second valve in response to determining a temperature of the lube oil of the lube oil supply line differs from a predetermined lube oil temperature threshold.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention relate to turbine systems. Specifically, as described herein, aspects of the invention relate to a lube oil supply system of a turbine system and method of regulating lube oil temperatures within a turbine system.

Figure 1:
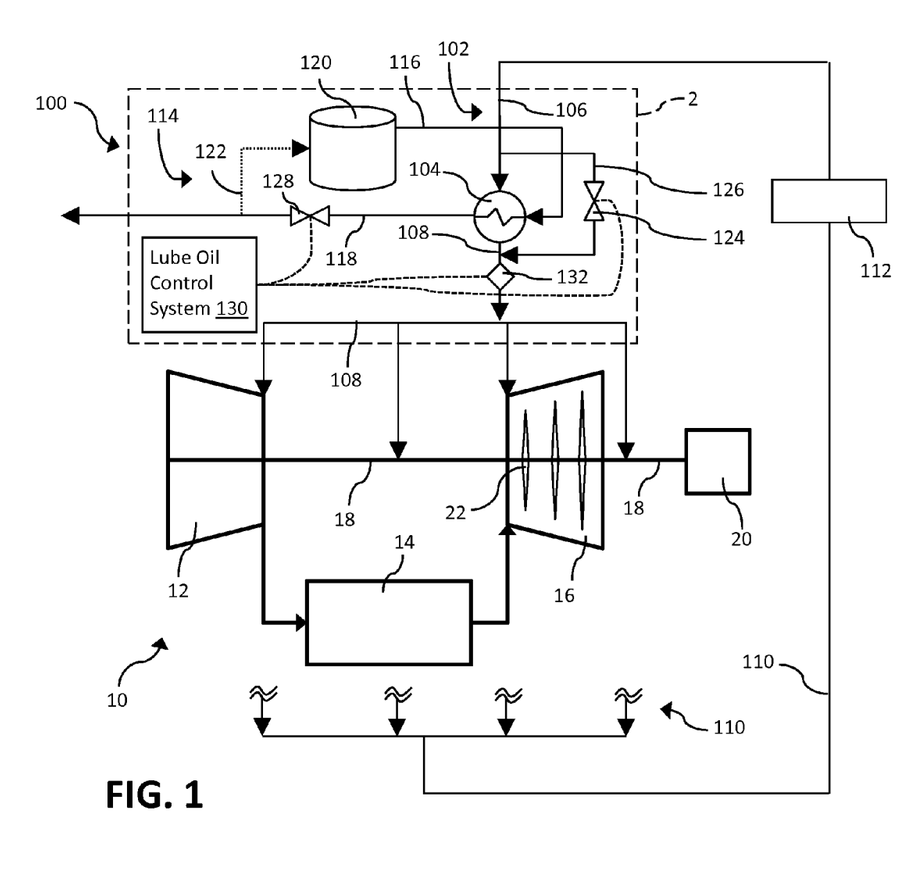
FIG. 1 shows a schematic depiction of a turbine system including a lube oil supply system according to various embodiments of the invention.

Turning to FIG. 1, a schematic depiction of a turbine system including a lube oil system is shown according to embodiments of the invention. Turbine system 10, as shown in FIG. 1 may be a conventional gas turbine system. However, it is understood that turbine system 10 may be configured as any conventional turbine system (e.g., steam turbine system) configured to generate power. As such, a brief description of the turbine system 10 is provided for clarity. As shown in FIG. 1, turbine system 10 may include a compressor 12, combustor 14 fluidly coupled to compressor 12 and a gas turbine component 16 fluidly coupled to combustor 14 for receiving a combustion product from combustor 14. Gas turbine component 16 may also be coupled to compressor 12 via shaft 18. Shaft 18 may be coupled to a generator 20 for creating electricity during operation of turbine system 10.

During operation of turbine system 10, as shown in FIG. 1, compressor 12 may take in air and compress the inlet air before moving the compressed inlet air to the combustor 14. Once in combustor 14, the compressed air may be mixed with a combustion product (e.g., fuel) and ignited. Once ignited, the compressed air-combustion product mixture is converted to a hot pressurized exhaust gas (hot gas) that flows through gas turbine component 16. The hot gas flows through gas turbine component 16, and specifically, passes over a plurality of buckets 22 (e.g., stages of buckets) coupled to shaft 18, which rotates buckets 22 and shaft 18 of turbine system 10. As shaft 18 of turbine system 10 rotates, compressor 12 and gas turbine component 16 are driven and generator 20 may create power (e.g., electric current).

In an embodiment, as shown in FIG. 1, turbine system 10 may also include a lube oil supply system 100 for providing a lube oil to turbine system 10 during operation. More specifically, lube oil supply system 100 may provide lube oil to various components (e.g., compressor 12, turbine component 16, shaft 18) of turbine system 10 during operation to substantially minimize or prevent mechanical wear and/or to substantially cool the various components of turbine system 10. As shown in FIG. 1, lube oil supply system 100 may include a lube oil supply line 102 in fluid communication with a heat exchanger 104 and turbine system 10. As shown in FIG. 1, lube oil supply line 102 may include a lube oil inlet conduit 106 positioned in series, upstream of heat exchanger 104, and a lube oil outlet conduit 108 positioned in series, downstream of heat exchanger 104. As discussed herein, inlet conduit 106 may provide lube oil of lube oil supply line 102 to heat exchanger 104 during operation of turbine system 10, such that heat exchanger 104 may regulate the temperature of the lube oil before passing the lube oil to outlet conduit 108 and subsequently to turbine system 10. As shown in FIG. 1, lube oil that is utilized and/or flows through turbine system 10 may be discharged into lube oil collection conduit 110 and may flow to lube oil reservoir 112 in fluid communication with lube oil collection conduit 110 and lube oil supply line 102. Lube oil reservoir 112 may include a tank of lube oil for turbine system 10, such that lube oil supply line 102 of lube oil supply system 100 may continuously provide lube oil to turbine system 10 during operation, as discussed herein.

Lube oil supply system 100 may also include a cooling fluid supply line 114 in fluid communication with heat exchanger 104. More specifically, as shown in FIG. 1, cooling fluid supply line 114 may include a cooling fluid inlet line 116 positioned in series, upstream of heat exchanger 104, and a cooling fluid outlet line 118 positioned in series, downstream of heat exchanger 104. As discussed herein, inlet line 116 may provide cooling fluid (e.g., water or other cooling fluid) of cooling fluid supply line 114 to heat exchanger 104 during operation of turbine system 10, such that heat exchanger 104 may utilize the cooling fluid to regulate the temperature of the lube oil before passing the lube oil to turbine system 10. After utilization by heat exchanger 104, the cooling fluid may exit the heat exchanger 104 via outlet line 118.

As shown in FIG. 1, the cooling fluid of cooling fluid supply line 114 may originate from a cooling fluid reservoir 120. More specifically, inlet line 116 of cooling fluid supply line 114 may be in fluid communication with cooling fluid reservoir 120, and may provide the cooling fluid of cooling fluid reservoir 120 to heat exchanger 104. Cooling fluid reservoir 120 may include any conventional component capable of storing or providing a cooling fluid to cooling fluid supply line 114 of lube oil supply system 100 including, but not limited to: a storage tank or tower, a river, an ocean, and a lake. For example, cooling fluid reservoir 120 may be a natural occurring or man-made body of water (e.g., ocean, lake, river), and may be in fluid communication with cooling fluid supply line 114. Where cooling fluid reservoir 120 may be a natural occurring or man-made body of water, an open-loop cooling fluid system may be utilized by lube oil supply system 100. In an open-loop cooling fluid system, cooling fluid of cooling fluid supply line 114 may exit heat exchanger 104 and may be discarded via outlet line 118. The cooling fluid discarded by outlet line 118 may flow to other portions of turbine system 10 for subsequent uses, or may be disposed of outside of turbine system 10.

Conversely, cooling fluid reservoir 120 may be a manufactured storage tank capable of holding a predetermined amount of cooling fluid. Where cooling fluid reservoir 120 may be a storage tank, a closed-loop cooling fluid system may be utilized by lube oil supply system 100. In a closed-loop cooling fluid system, cooling fluid of cooling fluid supply line 114 may exit heat exchanger 104 and may be recirculated back to cooling fluid reservoir 120 via cooling fluid outlet line 122 (shown in phantom). As such, in a closed-loop cooling fluid system, cooling fluid of cooling fluid supply line 114 may be continuously recirculated and may not require additional cooling fluid beyond the predetermined amount included in cooling fluid reservoir 120. It is understood that the closed-loop cooling fluid system, as shown in FIG. 1, may include a method of cooling the cooling fluid. More specifically, a conventional water-cooling device (e.g., air-to-fluid cooler, fluid-to-fluid cooler)(not shown) may be positioned within at least one of cooling fluid outlet line 122 or inlet line 116, and may be capable of decreasing the temperature of the cooling fluid of cooling fluid supply line 114, prior to the cooling fluid being provided to heat exchanger 104, as discussed herein.

Figure 2:
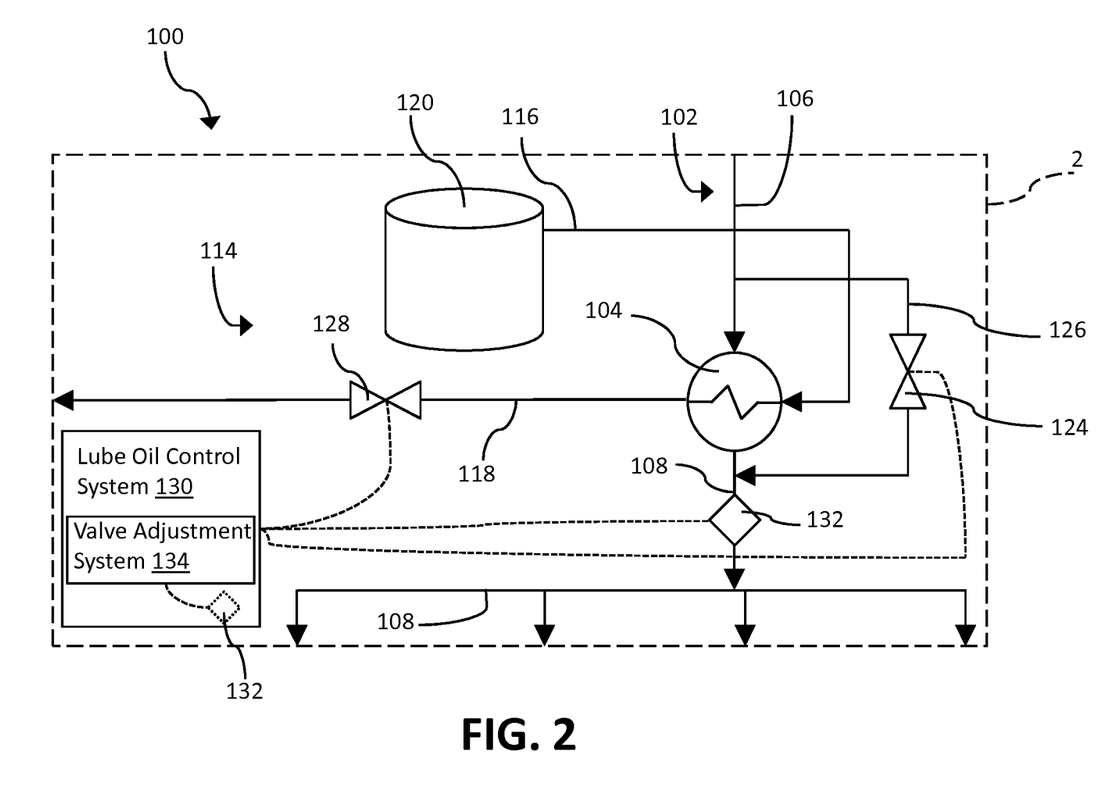
FIG. 2 shows a schematic depiction of a lube oil supply system of FIG. 1 including a lube oil control system according to various embodiments of the invention.
Figure 3:
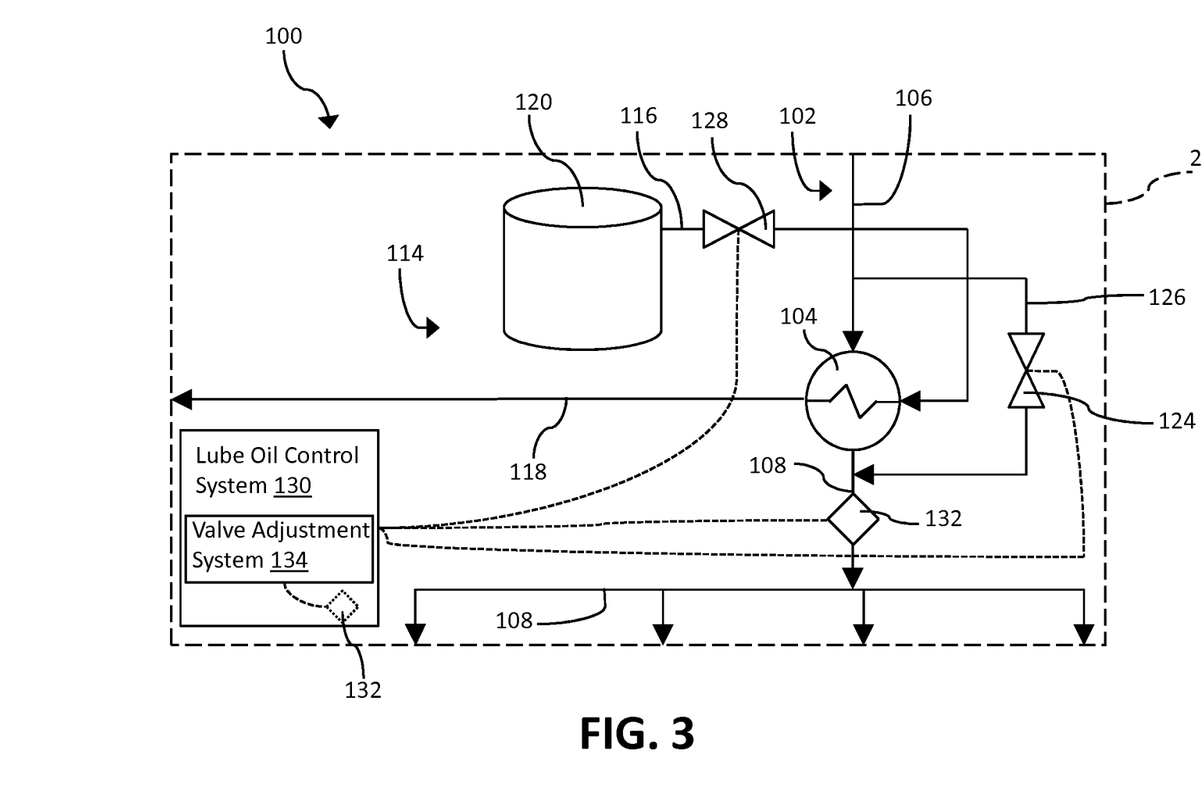
FIG. 3 shows a schematic depiction of a lube oil supply system including a lube oil control system according to alternative embodiments of the invention.

As shown in FIGS. 1-3, lube oil supply system 100 may also include a first valve 124 positioned on a lube oil bypass conduit 126 in fluid communication with lube oil supply line 102. More specifically, as shown in FIGS. 1-3, first valve 124 may be positioned on lube oil bypass conduit 126, where lube oil bypass conduit 126 is in fluid communication with inlet conduit 106 and outlet conduit 108 of lube oil supply line 102. As discussed herein, lube oil bypass conduit 126 may allow a portion of the lube oil of lube oil supply line 102 to flow from inlet conduit 106 to outlet conduit 108, without flowing through heat exchanger 104. As shown in FIG. 1, by positioning first valve 124 on bypass conduit 126, first valve 124 may be positioned substantially in parallel to heat exchanger 104. First valve 124 of lube oil supply system 100 may include any conventional valve including, but not limited to: hydraulic valve, pneumatic valve, solenoid valve, and motorized valve. As discussed herein, the position of first valve 124 may be modified to adjust the amount of lube oil of lube oil supply line 102 that may flow through bypass conduit 126 and bypass heat exchanger 104 of lube oil supply system 100. Additionally, and as discussed herein, the position of first valve 124 may be modified to also adjust the amount of lube oil of lube oil supply line 102 that may flow to heat exchanger 104 of lube oil supply system 100.

Lube oil supply system 100 may also include a second valve 128 positioned on cooling fluid supply line 114 in fluid communication with heat exchanger 104. More specifically, as shown in FIGS. 1 and 2, second valve 128 of lube oil supply system 100 may be positioned on outlet line 118 of cooling fluid supply line 114, and may be positioned downstream of heat exchanger 104. In another embodiment, as shown in FIG. 3, second valve 128 of lube oil supply system 100 may be positioned on inlet line 116 of cooling fluid supply line 114, and may be positioned upstream of heat exchanger 104. Second valve 128, similar to first valve 124, of lube oil supply system 100 may include any conventional valve including, but not limited to: hydraulic valve, pneumatic valve, solenoid valve, motorized valve, and manual valve. As discussed herein, the position of second valve 128 may be modified to adjust the amount of cooling fluid of cooling fluid supply line 114 that may be provided to heat exchanger 104 of lube oil supply system 100.

As shown in FIGS. 1-3, lube oil supply system 100 may also include a lube oil control system 130 operably connected to first valve 124 and second valve 128. As discussed herein, lube oil control system 130 may be operably connected to first valve 124 and second valve 128, and may be configured to modify the position of at least one of first valve 124 and second valve 128 during operation of turbine system 10. As shown in FIGS. 2 and 3, lube oil control system 130 may include a temperature sensor 132 operably connected to a valve adjustment system 134 (e.g., via wireless, hardwire, or other conventional means) of lube oil control system 130. As shown in FIGS. 1-3 temperature sensor 132 may be positioned within lube oil supply line 102. More specifically, temperature sensor 132 may be positioned within outlet conduit 108 of lube oil supply line 102, and may be positioned downstream of heat exchanger 104 of lube oil supply system 100. Temperature sensor 132 may be any conventional device capable of obtaining the temperature of the lube oil of lube oil supply line 102. More specifically, temperature sensor 132 may be configured as any conventional device for obtaining the temperature of the lube oil provided to outlet conduit 108 via heat exchanger 104 and/or bypass conduit 126. For example, temperature sensor 132 may include, but is not limited to: thermometer, thermocouples, thermistors, pyrometer, infrared sensor, etc. As discussed herein, temperature sensor 132 may continuously measure and provide the temperature of the lube oil to valve adjustment system 134 of lube oil control system 130 during operation of turbine system 10.

In an embodiment, as shown in FIGS. 2 and 3, valve adjustment system 134 of lube oil control system 130 may be operably connected to temperature sensor 132. As discussed herein, valve adjustment system 134 may be configured to determine if the temperature of the lube oil of lube oil supply line 102 differs from a predetermined lube oil temperature threshold. More specifically, and as discussed herein, valve adjustment system 134 may be configured to determine if the temperature of the lube oil of lube oil supply line 102 differs from a predetermined lube oil temperature threshold, which may result in fouling within heat exchanger 104, during operation of turbine system 10. Additionally, as discussed herein, valve adjustment system 134 of lube oil control system 130 may be configured to modify a position of at least one of first valve 124 and second valve 128 in response to determining the temperature of the lube oil of lube oil supply line 102 differs from a predetermined lube oil temperature threshold.

Figure 4:
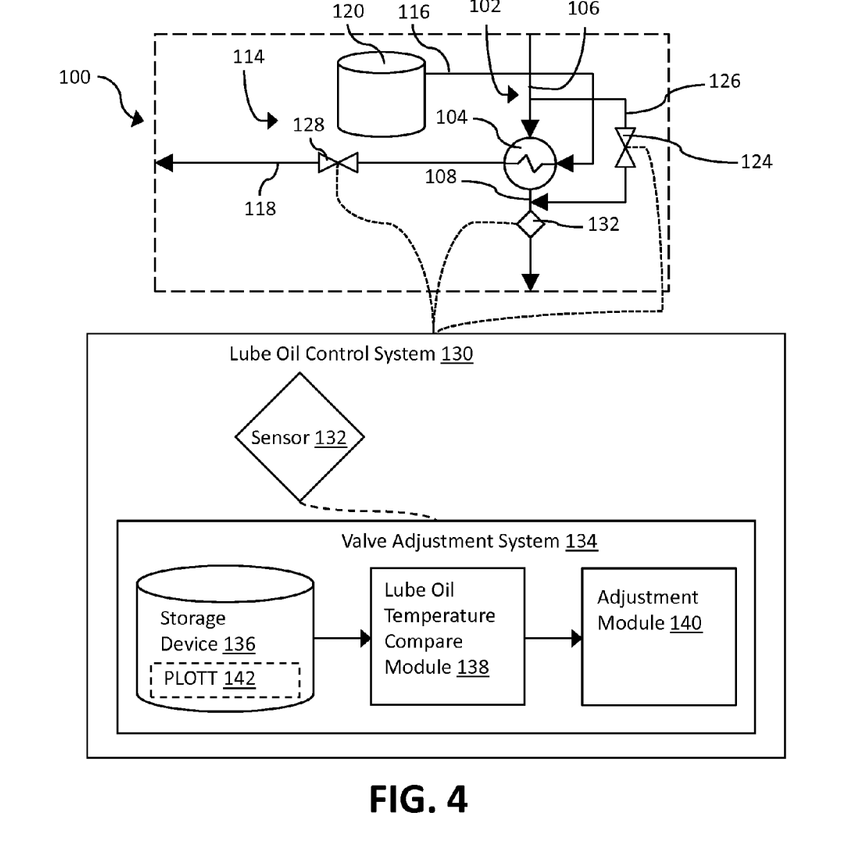
FIG. 4 shows a schematic depiction of a lube oil control system operably coupled to a lube oil supply system according to various embodiments of the invention.

Turning to FIG. 4, a schematic depiction of lube oil control system 130 operably coupled to lube oil supply system 100 is shown according to embodiments of the invention. In the Figures, it is understood that similarly numbered components may function in a substantially similar fashion. Redundant explanation of these components has been omitted for clarity. As shown in FIG. 4, valve adjustment system 134 of lube oil control system 130 may include a storage device 136, a lube oil temperature compare module 138 ("compare module 138," hereafter), and an adjustment module 140. Storage device 136 may be communicatively connected to compare module 138, and compare module 138 may be communicatively connected to adjustment module 140. Valve adjustment system 134 of lube oil control system 130 may be communicatively connected to temperature sensor 132 and may be configured to receive data relating to the temperature of the lube oil of the lube oil supply line 102 sensed by temperature sensor 132. More specifically, and as discussed herein, compare module 138 may be configured to receive or obtain temperature data from temperature sensor 132 relating to the temperature of the lube oil positioned within outlet conduit 108 of lube oil supply line 102 during the operation of turbine system 10.

In an embodiment, as shown in FIG. 4, storage device 136 of valve adjustment system 134 may store a predetermined lube oil temperature threshold 142 ("PLOTT 142," hereafter) (as shown in phantom) for turbine system 10. In another embodiment, not shown, PLOTT 142 may be stored on an external device and may be obtained and temporarily stored on storage device 136. PLOTT 142 may include data defining a desired temperature threshold for the lube oil to be supplied to turbine system 10 via lube oil supply line 102. More specifically, PLOTT 142 may include data defining a desired temperature threshold for the lube oil to be supplied to turbine system 10 wherein the desired temperature threshold for the lube oil is based on operational characteristics of turbine system 10. The operational characteristics of turbine system 10 which PLOTT 142 may be based upon include, but are not limited to: the operating temperature of turbine system 10, the operational phase (e.g., start-up, steady state) of turbine system 10, the components (e.g., compressor 12, turbine component 16, shaft 18) of turbine system 10 receiving lube oil from lube oil supply system 100, the size of turbine system 10 and/or its components, power output of turbine system 10, ambient temperature of turbine system 10, the lube oil composition used in lube oil supply system 100, etc. PLOTT 142 may be represented or embodied in a variety of conventional data forms including, but not limited to, a look-up table, an algorithm, a relationship graph, etc.

Also shown in FIG. 4, compare module 138 of valve adjustment system 134 may be configured to obtain or receive data (e.g., lube oil temperature) from temperature sensor 132 and data (e.g., PLOTT 142) from storage device 136, and may be configured to compare the data obtained therein. More specifically, compare module 138 may be configured to compare the actual temperature of the lube oil sensed by temperature sensor 132 with PLOTT 142 of storage device 136, and may determine if the actual temperature of the lube oil within outlet conduit 108 differs from PLOTT 142. As discussed herein, compare module 138 may obtain the operational characteristics of turbine system 10, and may determine and obtain the desired PLOTT 142 stored in storage device 136 based on the obtained operational characteristics of turbine system 10. Compare module 138 may also be configured to determine if the actual temperature of the lube oil in lube oil supply line 102 is equal to, less than or greater than PLOTT 142. As discussed herein, where the actual temperature of the lube oil differs from PLOTT 142, valve adjustment system 134 of lube oil control system 130 may modify the position of first valve 124 and/or second valve 128 to regulate the lube oil temperature in lube oil supply line 102.

Additionally, compare module 138 may be configured to transmit an indicator to adjustment module 140 of valve adjustment system 134 in response to determining that the actual temperature of the lube oil of lube oil supply line 102 differs from PLOTT 142. More specifically, after determining the actual temperature of the lube oil within outlet conduit 108 of lube oil supply line 102 differs from PLOTT 142, compare module 138 may transmit an indicator to adjustment module 140, indicating that the actual temperature of lube oil of lube oil supply line 102 is equal to, less than or greater than PLOTT 142.

Adjustment module 140 of valve adjustment system 134 may be configured to receive or obtain the indicator from compare module 138 in response to determining that the actual temperature of the lube oil of lube oil supply line 102 differs from PLOTT 142, and may modify the position of at least one of first valve 124, and second valve 128. More specifically, adjustment module 140 may provide an electronic signal to first valve 124 and/or second valve 128, operably connected to lube oil control system 130, in order to modify the position of first valve 124 and/or second valve 128 in response to the determining that the actual temperature of the lube oil differs from PLOTT 142. Adjustment module 140 of valve adjustment system 134 may modify the position of first valve 124 and/or second valve 128 using a split range of control. That is, adjustment module 140 may only send a signal to one valve (e.g., first valve 124, second valve 128) at a time, such that only one valve's position may be modified at a time. As discussed herein, if it is required that both valve's (e.g., first valve 124, second valve 128) position be modified, adjustment module 140 may send two distinct signals; one signal to each valve. Additionally, in an alternative embodiment, adjustment module 140 of valve adjustment system 134 may be configured to continuously send simultaneous signals to first valve 124 and/or second valve 128. As such, the positions of first valve 124 and/or second valve 128 of lube oil supply system 100 may be continuously modified to regulate the temperature of the lube oil in lube oil supply line 102 being utilized by turbine system 10.

In an embodiment, where the actual temperature of the lube oil of lube oil supply line 102 is one of equal to or less than PLOTT 142, the temperature of the lube oil may not require substantial adjustment before the lube oil is provided to turbine system 10 via lube oil supply line 102. As a result, the positions of first valve 124 and second valve 128 of lube oil supply system 100 may be modified accordingly, so the lube oil may be provided to turbine system 10 without substantial adjustment to the temperature. More specifically, where the actual temperature of the lube oil of lube oil supply line 102 is one of equal to or less than PLOTT 142, the position of first valve 124 on bypass conduit 126 may be modified by valve adjustment system 134 of lube oil control system 130 to be substantially open. As a result of first valve 124 being substantially open, the majority of the lube oil flowing through lube oil supply line 102 may bypass heat exchanger 104 by flowing through bypass conduit 126, and may be provided to outlet conduit 108, and subsequently to turbine system 10. The cooling fluid of cooling fluid supply line 114 and lube oil of lube oil supply line 102 may move through the respective lines or conduits (e.g., cooling fluid inlet line 116, inlet conduit 106) using conventional devices including, but not limited to: pumps, blowers, or other fluid-propulsion devices. For example, a lube oil pump (not shown) may be positioned on inlet conduit 106, and more specifically, may be positioned in series, upstream of heat exchanger 104 and downstream of the lube oil reservoir 112. Additionally, a coolant pump (not shown) may be positioned on cooling fluid inlet line 116, and more specifically, may be positioned in series, upstream of heat exchanger 104 and downstream of cooling fluid reservoir 120. In bypassing heat exchanger 104, the majority of the lube oil may not be subject to the heat exchange process performed by heat exchanger 104, and may substantial maintain its temperature.

Additionally, where the actual temperature of the lube oil of lube oil supply line 102 is one of equal to or less than PLOTT 142, and the temperature of lube oil may not require substantial adjustment, the position of second valve 128 on cooling fluid supply line 114 may also be modified. More specifically, in response to the actual temperature of the lube oil of lube oil supply line 102 being one of equal to, or less than, PLOTT 142, and the position of first valve 124 being substantially open, valve adjustment system 134 of lube oil control system 130 may modify the position of second valve 128 to be one of closed or, partially open. That is, when the temperature of lube oil may not require substantial adjustment, heat exchanger 104 may not require a substantial amount or any cooling fluid from cooling fluid supply line 114 to cool the lube oil of lube oil supply line 102. Additionally, the majority of the lube oil may flow through bypass conduit 126 to outlet conduit 108, and not heat exchanger 104, as a result of first valve 124 being open. As such, second valve 128 positioned on outlet line 118 of cooling fluid supply line 114 may be closed, or partially open, to substantially decrease the flow of cooling fluid through heat exchanger 104 of lube oil supply system 100.

Conversely, in an embodiment, where the actual temperature of the lube oil of lube oil supply line 102 is greater than PLOTT 142, the temperature of the lube oil may require substantial adjustment before the lube oil is provided to turbine system 10 via lube oil supply line 102. As a result, the positions of first valve 124 and second valve 128 of lube oil supply system 100 may be modified accordingly, so the lube oil may be provided to turbine system 10 subsequent to an adjustment in the temperature. More specifically, where the actual temperature of the lube oil of lube oil supply line 102 is greater than PLOTT 142, the position of first valve 124 on bypass conduit 126 may be modified by valve adjustment system 134 of lube oil control system 130 to be one of closed, or partially open. As a result of first valve 124 being one of closed, or partially open, the majority, or all, of lube oil flowing through lube oil supply line 102 may be provided to heat exchanger 104, so heat exchanger 104 may reduce the temperature of lube oil of lube oil supply line 102. That is, by closing, or partially opening, first valve 124, the lube oil may flow through heat exchanger 104 to reduce the temperature, prior to the lube oil being provided to outlet conduit 108, and subsequently to turbine system 10.

In addition, where the actual temperature of the lube oil of lube oil supply line 102 is greater than PLOTT 142, and the temperature of lube oil may require substantial adjustment, the position of second valve 128 on cooling fluid supply line 114 may also be modified. More specifically, in response to the actual temperature of the lube oil of lube oil supply line 102 being greater than PLOTT 142, and the position of first valve 124 being one of closed, or partially open, valve adjustment system 134 of lube oil control system 130 may also modify the position of second valve 128 to be substantially open. That is, when the temperature of lube oil may require substantial adjustment, heat exchanger 104 may require a substantial amount of cooling fluid from cooling fluid supply line 114 to cool the lube oil of lube oil supply line 102. As a result, second valve 128 positioned on outlet line 118 of cooling fluid supply line 114 may be substantially open in order to provide a desired amount of cooling fluid to heat exchanger 104 to cool the lube oil of lube oil supply line 102.

Valve adjustment system 134, and its respective components (e.g., storage device 136, compare module 138, etc.), may be configured as any conventional data processing system (e.g., computer system, hard drives) capable of receiving, temporarily storing and transmitting/forwarding data and signals within the system and to external components coupled to the system (e.g., first valve 124, second valve 128). More specifically, valve adjustment system 134 may be configured as any conventional hardware device (computer system controller), and the components of valve adjustment system 134 (e.g., storage device 136, compare module 138, etc.) may be configured as software components stored within said computer system forming valve adjustment system 134. In an example embodiment, valve adjustment system 134 may be configured as a circuit board implemented on a conventional computer system, and may include associated software for performing the operational functions discussed herein.

Figure 5:
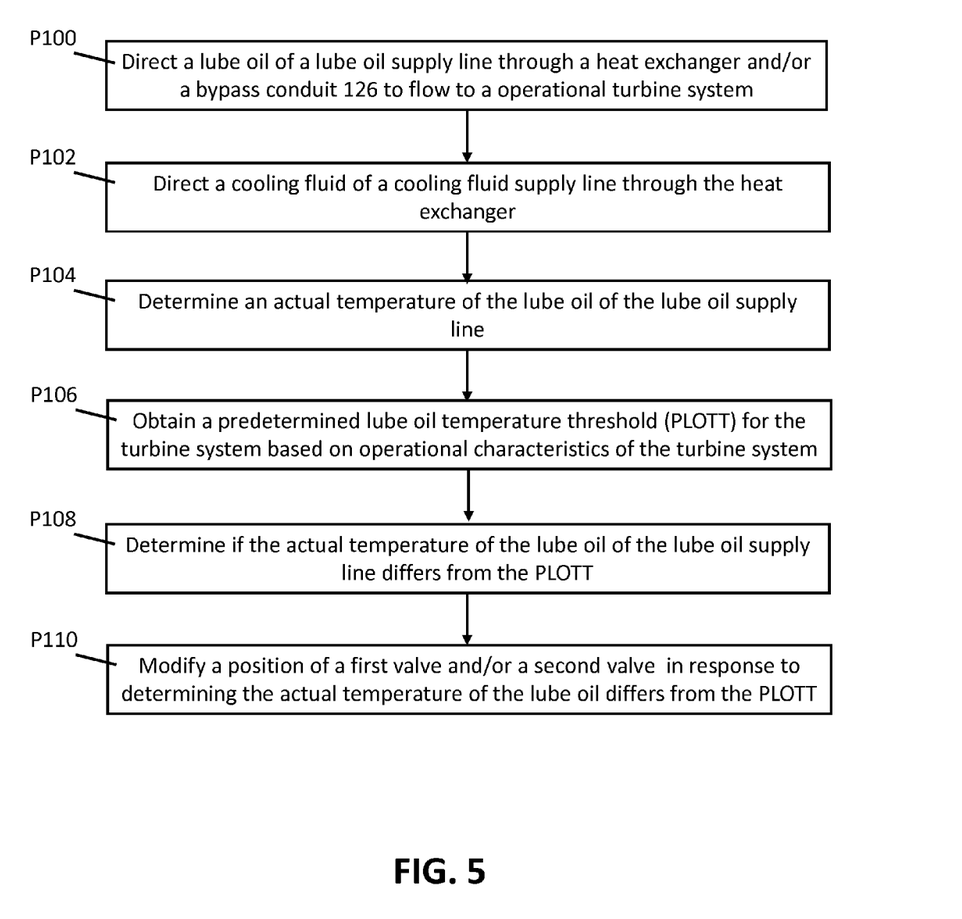
FIG. 5 shows a flow diagram illustrating processes of regulating the lube oil temperature in a turbine system performed using lube oil control system, according to embodiments of the invention.

Turning to FIG. 5, with continued reference to FIGS. 1 and 4, a flow diagram depicting a processes for regulating the lube oil temperature in turbine system 10 performed using lube oil control system 130 may now be described, according to embodiments of the invention. One illustrative process according to various embodiments can include the following processes:

Process P100: directing lube oil of lube oil supply line 102 through at least one of heat exchanger 104 in fluid communication with lube oil supply line 102, and/or bypass conduit 126 of lube oil supply line 102. That is, during operation of turbine system 10, lube oil supply system 100 may provide turbine system 10 with lube oil by directing lube oil through heat exchanger 104 and/or bypass conduit 126, and subsequently to outlet conduit 108. The lube oil may then be provided to various components (e.g., compressor 12, turbine component 16, shaft 18) of turbine system 10 during operation via outlet conduit 108.

Process P102: directing a cooling fluid of cooling fluid supply line 114 through heat exchanger 104 in fluid communication with cooling fluid supply line 114. That is, during operation of turbine system 10, cooling fluid supply line 114 may direct cooling fluid to heat exchanger 104 at the same time, or directly after, lube oil supply line 102 directs lube oil through heat exchanger 104 and/or bypass conduit 126, as in process P100 and discussed herein. The cooling fluid provided to heat exchanger 104 via cooling fluid supply line 114 may aid in decreasing the temperature of the lube oil flowing through heat exchanger 104, as discussed herein.

Process P104: determining the actual temperature of the lube oil of the lube oil supply line 102. More specifically, as lube oil is directed through lube oil supply line 102 and subsequently to turbine system 10 in process P100, temperature sensor 132 of lube oil control system 132 may determine the temperature of the lube oil as it flows through outlet conduit 108. Compare module 138 of valve adjustment system 134 may obtain or receive the data relating to the temperature of the lube oil of lube oil supply line 102. More specifically, compare module 138 may receive from temperature sensor 132 the data relating to the temperature of the lube oil within outlet conduit 108 of lube oil supply system 102.

Process P106: obtaining PLOTT 142 for turbine system 10 based on operational characteristics of turbine system 10. Compare module 138 may obtain or receive PLOTT 142 from storage device 136. More specifically, compare module 138 of valve adjustment system 134 may receive operational characteristics of turbine system 10 and, dependent on those operational characteristics of turbine system 10, may obtain PLOTT 142 from storage device 136. Compare module 138 may receive operational characteristics of turbine system 10 via a user (e.g., turbine system 10 operator) input to lube oil control system 130, and/or by being operably connected to a control system (not shown) for turbine system 10. For example, compare module 138 of valve adjustment system 134 may be operably connected to a control system (not shown) of turbine system 10, which may provide compare module 138 with operational characteristics relating to turbine system 10 including, but not limited to: the operational temperature of turbine component 16, power output of turbine system 10, and ambient temperature of turbine system 10. After receiving the operational characteristics of turbine system 10, compare module 138 may obtain the desired PLOTT 142 of the lube oil of lube oil supply system 100 utilized by turbine system 10. In an example, where PLOTT 142 is stored on storage device 136 in the form of a look-up table, compare module 138 may utilize the obtained operational characteristics of turbine system 10 to determine the desired PLOTT 142 from the look-up table. More specifically, compare module 138 may obtain data relating to the operational temperature of turbine system 10, the ambient temperature of turbine system 10 and the size of turbine system 10 from a control system (not shown) of turbine system 10, and may subsequently compare the obtained data with the look-up table representing PLOTT 142. After comparing the obtained data within the look-up table of PLOTT 142, compare module 138 may determine the desired PLOTT 142 based on the obtained operational characteristics of turbine system 10, and may utilized the determined PLOTT 142 for further processing, as discussed herein.

Process P108: determining if the actual temperature of the lube oil of lube oil supply line 102 differs from PLOTT 142. More specifically, compare module 138 of valve adjustment system 134 may obtain or receive both the actual temperature of the lube oil from temperature sensor 132 and the PLOTT 142 from storage device 136 in process P106, and may subsequently compare the actual temperature of the lube oil with the PLOTT 142. Compare module 138 may compare the obtained data (e.g., actual temperature, PLOTT 142) and may determine that the actual temperature of the lube oil of lube oil supply line 102 is one of: equal to PLOTT 142, less than PLOTT 142 or greater than PLOTT 142. As discussed herein, where the actual temperature of the lube oil of lube oil supply line 102 differs from PLOTT 142, compare module 138 may transmit an indicator to adjustment module 140 of valve adjustment system 134 indicating that the actual temperature of the lube oil is one of: equal to, less than, or greater than PLOTT 142.

Process P110: modifying a position of at least one of first valve 124 or second valve 128 in response to determining the actual temperature of the lube oil of lube oil supply line 102 differs from PLOTT 142 in process P108. More specifically, adjustment module 140 transmit an indicator to compare module 138, indicating that the actual temperature of the lube oil is one of: equal to, less than, or greater than PLOTT 142, and adjustment module 140 may modify the position of first valve 124 and/or second valve 128 to regulate the temperature of the lube oil being supplied to turbine system 10. As discussed herein, where the actual temperature of the lube oil is one of: equal to, or less than, PLOTT 142, the position of first valve 124 may be modified to be open, and/or the position of second valve 128 may be modified to be one of closed, or partially open. Conversely, and as discussed herein, where the actual temperature of the lube oil is greater than PLOTT 142, the position of first valve 124 may be modified to be one of closed, or partially open, and/or the position of second valve 128 may be modified to be substantially open.

It is understood that adjustment module 140 may be capable of determining the position of first valve 124 and/or second valve 128 prior to modifying the position of first valve 124 and/or second valve 128. More specifically, first valve 124 and/or second valve 128 of lube oil supply system 100 may also include any conventional position sensor (not shown) operably connected to adjustment module 140 of valve adjustment system 134 to provide adjustment module 140 with a current position of each valve. As such, adjustment module 140 may determine that first valve 124 and/or second valve 128 may be pre-positioned in a desired position from a prior adjustment, and the position of the valves may not require further modifying by the adjustment module 140. In this instance, it is understood that the process discussed herein may be repeated and continuously performed such that the lube oil of lube oil supply system 100 may be provided to turbine system 10 at a desired temperature.

In utilizing lube oil supply system 100, as discussed herein, turbine system 10 may be provided with lube oil at a desired temperature to substantially prevent undesirable wear on the components (e.g., compressor 12, turbine component 16, shaft 18) of turbine system 10. Additionally, by regulating the temperature of the lube oil using lube oil control system 130, undesirable fouling in heat exchanger 104 may be substantially prevented or eliminated. As such, heat exchanger 104 may be free from undesirable wear and may operate substantially within an optimal operational range.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lube oil supply system comprising:
    a first valve positioned on a lube oil bypass conduit in fluid communication with a lube oil supply line to a heat exchanger, the first valve positioned in parallel to the heat exchanger in fluid communication with the lube oil supply line;
    a second valve positioned on a cooling fluid supply line in fluid communication with the heat exchanger; and
    a lube oil control system operably connected to the first valve and the second valve, the lube oil control system configured to:
    modify a position of at least one of the first valve, or the second valve in response to determining a temperature of a lube oil of the lube oil supply line differs from a predetermined lube oil temperature threshold.

2. The system of claim 1, wherein the second valve is positioned on the cooling fluid supply line, downstream of the heat exchanger.

3. The system of claim 1, wherein the second valve is positioned on the cooling fluid supply line, upstream of the heat exchanger.

4. The system of claim 1, further comprising a turbine system in fluid communication with the lube oil supply line, wherein the lube oil supply line provides the lube oil to the turbine system during operation.

5. The system of claim 4, wherein the predetermined lube oil temperature threshold is based upon operational characteristics of the turbine system.

6. The system of claim 1, further comprising a temperature sensor positioned within the lube oil supply line, downstream of the heat exchanger, wherein the temperature sensor is operably connected to the lube oil control system for providing the temperature of the lube oil of the lube oil supply line.

7. The system of claim 1, wherein the first valve is substantially open in response to determining the temperature of the lube oil of the lube oil supply line is one of equal to, or less than, the predetermined lube oil temperature threshold.

8. The system of claim 7, wherein the second valve is one of closed or partially open, in response to the first valve being substantially opening.

9. The system of claim 1, wherein the first valve is one of closed or partially open in response to determining the temperature of the lube oil of the lube oil supply line is greater than the predetermined lube oil temperature threshold.

10. The system of claim 9, wherein the second valve is substantially open in response to the first valve being one of closed or partially open.

11. An apparatus comprising:
a turbine system;
a lube oil supply line in fluid communication with the turbine system, the lube oil supply line including:
  a lube oil bypass conduit; and
  a first valve positioned on the lube oil bypass conduit;
a heat exchanger in fluid communication with the lube oil supply line, the heat exchanger positioned in parallel to the first valve positioned on the lube oil bypass conduit of the lube oil supply line;
a second valve positioned on a cooling fluid supply line in fluid communication with the heat exchanger; and
a lube oil control system operably connected to the first valve and the second valve, the lube oil control system configured to:
modify a position of at least one of the first valve, or the second valve in response to determining a temperature of a lube oil of the lube oil supply line differs from a predetermined lube oil temperature threshold.

12. The apparatus of claim 11, wherein the second valve is positioned at one of downstream of the heat exchanger, or upstream of the heat exchanger.

13. The apparatus of claim 11, wherein the predetermined lube oil temperature threshold is based upon operational characteristics of the turbine system.

14. The apparatus of claim 11, further comprising a temperature sensor positioned within the lube oil supply line, downstream of the heat exchanger, wherein the temperature sensor is operably connected to the lube oil control system for providing the temperature of the lube oil of the lube oil supply line.

15. The apparatus of claim 11, wherein the first valve is substantially open in response to determining the temperature of the lube oil of the lube oil supply line is one of equal to, or less than, the predetermined lube oil temperature threshold.

16. The apparatus of claim 15, wherein the second valve is one of closed or partial open, in response to the first valve being substantially opening.

17. The apparatus of claim 11, wherein the first valve is one of closed or partially open in response to determining the temperature of the lube oil of the lube oil supply line is greater than the predetermined lube oil temperature threshold.

18. The apparatus of claim 17, wherein the second valve is substantially open in response to the first valve being one of closed or partially open.

19. A method of regulating lube oil temperature in a turbine system, performed using a lube oil control system, the method comprising:
directing lube oil of a lube oil supply line through at least one of:
a heat exchanger in fluid communication with the lube oil supply line, or
a lube oil bypass conduit of the lube oil supply line, the lube oil bypass conduit including a first valve positioned in parallel to the heat exchanger;
directing a cooling fluid of a cooling fluid supply line through the heat exchanger in fluid communication with the cooling fluid supply line, the cooling fluid supply line including a second valve; and
modifying a position of at least one of the first valve, or the second valve in response to determining a temperature of the lube oil of the lube oil supply line differs from a predetermined lube oil temperature threshold.

20. The method of claim 19, further comprising:
substantially opening the first valve in response to determining the temperature of the lube oil of the lube oil supply line is one of equal to, or less than, the predetermined lube oil temperature threshold; and
closing the second valve in response to the opening of the first valve.

* * * * *